United States Patent
Nakamasu et al.

(10) Patent No.: US 7,902,712 B2
(45) Date of Patent: Mar. 8, 2011

(54) MAGNETIC MEMBER, ROTOR, MOTOR, COMPRESSOR, BLOWER, AIR CONDITIONER AND VEHICLE-MOUNTED AIR CONDITIONER

(75) Inventors: Shin Nakamasu, Shiga (JP); Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 131 days.

(21) Appl. No.: 11/885,160

(22) PCT Filed: Feb. 2, 2006

(86) PCT No.: PCT/JP2006/301770
§ 371 (c)(1),
(2), (4) Date: Sep. 17, 2008

(87) PCT Pub. No.: WO2006/092924
PCT Pub. Date: Sep. 8, 2006

(65) Prior Publication Data
US 2009/0212652 A1 Aug. 27, 2009

(30) Foreign Application Priority Data
Feb. 28, 2005 (JP) ................. 2005-053206

(51) Int. Cl.
*H02K 1/27* (2006.01)
(52) U.S. Cl. ........... 310/156.57; 310/156.53; 310/156.56
(58) Field of Classification Search . 310/156.35–156.58
See application file for complete search history.

(56) References Cited

U.S. PATENT DOCUMENTS

| | | | | |
|---|---|---|---|---|
| 3,629,626 A | * | 12/1971 | Abbott | 310/49.45 |
| 5,345,133 A | * | 9/1994 | Satake | 310/266 |
| 5,672,926 A | * | 9/1997 | Brandes et al. | 310/181 |
| 6,274,960 B1 | | 8/2001 | Sakai et al. | |
| 6,459,185 B1 | * | 10/2002 | Ehrhart et al. | 310/156.45 |
| 6,486,581 B2 | * | 11/2002 | Miyashita et al. | 310/156.53 |
| 7,042,127 B2 | | 5/2006 | Tsuruta et al. | |
| 7,105,971 B2 | * | 9/2006 | Asai et al. | 310/156.53 |
| 2003/0107288 A1 | * | 6/2003 | Takita et al. | 310/211 |
| 2006/0145556 A1 | * | 7/2006 | Aota et al. | 310/156.53 |

FOREIGN PATENT DOCUMENTS

CN 1249556 A 4/2000

(Continued)

OTHER PUBLICATIONS

Kazuo Onishi; "Investigation on Torque Evaluation and Optimum Structure of Permanent Magnet Motors"; The Transactions of the Institute of Electrical Engineering of Japan on Industry Applications, 1995; vol. 115-D, No. 7, pp. 930-935.

(Continued)

*Primary Examiner* — Tran N Nguyen
(74) *Attorney, Agent, or Firm* — Global IP Counselors (57) ABSTRACT

A magnetic member with an annular outer periphery and an inner periphery includes first portions and second portions alternately disposed in its circumferential direction. The first portions and second portions are magnetically separated in the circumferential direction by gaps, which block magnetic fluxes from flowing in the circumferential direction between the first portion and second portion. The first portions respectively have holes extending almost in the circumferential direction. The gaps are provided at both ends of the holes in the circumferential direction between the outer periphery and inner periphery. An interior permanent magnet type rotor can be structured by inserting field magnets into the holes.

18 Claims, 8 Drawing Sheets

FOREIGN PATENT DOCUMENTS

| | | |
|---|---|---|
| CN | 1538589 A | 10/2004 |
| JP | H09-056126 | 2/1997 |
| JP | H09-233887 | 9/1997 |
| JP | 2000-050585 | 2/2000 |
| JP | 2000-324728 | 11/2000 |
| JP | 2002-084720 | 3/2002 |
| JP | 2002-335658 | 11/2002 |
| JP | 2002-369467 | 12/2002 |
| JP | 2003-061283 | 2/2003 |
| JP | 2004-072978 | 3/2004 |
| JP | 2004-135375 | 4/2004 |
| JP | 2004-187370 | 7/2004 |
| JP | 2004-222467 | 8/2004 |
| JP | 2004-222492 A | 8/2004 |
| JP | 2004-260970 | 9/2004 |
| JP | 2004-301038 A | 10/2004 |
| JP | 2004-304958 | 10/2004 |

OTHER PUBLICATIONS

"Higher Performance of Special-purpose-oriented Reluctance Torque Assisted Motor"; IEEJ Technical Report vol. 920, Mar. 2003.

Office Action of corresponding Japanese Application No. 2007-505823 dated Sep. 28, 2010.

* cited by examiner

MAGNETIC MEMBER, ROTOR, MOTOR, COMPRESSOR, BLOWER, AIR CONDITIONER AND VEHICLE-MOUNTED AIR CONDITIONER

CROSS-REFERENCE TO RELATED APPLICATIONS

This U.S. National stage application claims priority under 35 U.S.C. §119(a) to Japanese Patent Application No. 2005-053206, filed in Japan on Feb. 28, 2005, the entire contents of which are hereby incorporated herein by reference.

TECHNICAL FIELD

The present invention relates to a motor, among others, an interior permanent magnet type rotor. The motor can be mounted as a driving source of a compressor or a blower.

BACKGROUND ART

In achieving a compact high-efficiency motor, a permanent-magnet-excited motor using permanent magnets is most effective. General indexes of permanent-magnet-excited synchronous motor are introduced in Kazuo Onishi, "Investigation on Torque Evaluation and Optimum Structure of Permanent Magnet Motors", The Transactions of the Institute of Electrical Engineering of Japan on Industry Applications, 1995, Volume 115-D, Number 7, pp. 930-935, which will be mentioned below.

Motors with cooling conditions equated and having the same size are assumed to be nearly equal in allowable dissipation Wc based on the relation between temperature rise and heat radiation. Torque T and allowable dissipation Wc are in the relation of Equation (1), and the coefficient Km is called a motor constant.

$$T = Wc \cdot \sqrt{Km} \quad (1)$$

Accordingly, when the allowable dissipation Wc is constant, the torque T increases as the motor constant Km increases. The motor constant Km can therefore be used as an index value of allowable torque (usually, continuous rating torque).

The motor constant Km can be expressed by Equation (2). Herein, pole pair number p, winding maximum flux linkage Φ, space factor fs, total cross section St of winding slots, specific resistance ρ of winding, and average length l of unit coil are introduced. In addition, it is assumed that the current waveform is a sine wave, and magnetic fluxes alternate sinusoidally. Further, most part of loss in a motor, particularly when the motor is compact, is copper loss, and is considered omitting iron loss.

$$Km = (1/2) p \Phi \sqrt{fsSt/\rho l} \quad (2)$$

Therefore, the motor constant Km needs to be increased in order to increase the motor efficiency per volume of motor, and the following measures are effective based on Equation (2):

(i) increasing the space factor fs of winding;
(ii) shortening the average length l of unit coil;
(iii) reducing the specific resistance ρ of winding;
(iv) increasing the winding maximum flux linkage Φ;
(v) increasing the pole pair number p; and
(vi) increasing the total cross section St of winding slot.

With regard to the measure (i), devices for slot configuration is proposed in Japanese Patent Application Laid-Open Nos. 2004-187370 and 2000-324728, for example. With regard to the measure (ii), it is achieved by shifting from the use of distributed winding to the use of concentrated winding. With regard to the measure (iii), the only existing material that has a specific resistance lower than copper is silver, which is not desirable costwise and industrially.

The measure (iv) involves employing a rare-earth magnet for permanent magnets, and in addition, increasing the surface area of pole face per unit volume of the motor. However, the increase in surface area of pole faces is not desirable from two points of view.

One of them lies in that it is desirable to employ an armature with windings wound therearound as a stator and to employ permanent magnets as field magnets in a rotor, and it is further desirable that the rotor be surrounded by the stator. Employment of the armature as the rotor requires a mechanical commutator for rectifying a winding current, which is not desirable in terms of high durability, high reliability, high dust resistance, and the like, so that it is desirable to constitute the rotor using permanent magnets as field magnets. Furthermore, it is desirable that a stator surrounding the rotor from outside be present in terms of inserting the motor into, for example, the inside of a compressor or the like. Then, the increase in surface area of pole face may become a cause of interfering with size reduction of the motor.

The other point of view also relates to the measure (vi). When increasing the surface area of pole face while leaving the outer diameter of the stator surrounding the rotor as it is in order to reduce the motor in size, the inner diameter of that stator also increases. This shortens slots of that stator in the radial direction, which reduces the total cross section St of winding slots. This is opposite to the measure desired in the measure (vi).

Further, in the case where the pole pair number p is increased on the basis of the measure (v), the total cross section St of winding slots is reduced.

On the other hand, as introduced in Research Specialized Committee of Higher Performance of Special-purpose-oriented Reluctance Torque Assisted Motor, "Higher Performance of Special-purpose-oriented Reluctance Torque Assisted Motor", IEEJ Technical Report vol. 920, March 2003, which will be mentioned below, not only the magnet torque, but also the reluctance torque can be utilized in an interior permanent magnet type rotor in which field magnets are embedded in the inside of the rotor. Providing rotation angle dependency for the magnetic resistance of an iron portion of the rotor relative to the stator allows the armature current phase when energized to be shifted toward an advanced angle, and utilizing the reluctance torque generated from saliency of magnetic resistance increases the torque.

That is, introducing the pole pair number pn, flux linkage Φa, d-axis current Id, q-axis current Iq, d-axis inductance Ld and q-axis inductance Lq, the torque T is expressed by Equation (3).

$$T = Pn(\Phi a Iq + (Ld - Lq) Id Iq) \quad (3)$$

Similarly to the measures (iv) and (v), it is also desirable to increase the flux linkage Φa and pole pair number pn. However, increasing the q-axis inductance Lq further contributes to the increase in torque. This is because shifting the armature current phase toward an advanced angle makes the d-axis current Id negative.

On the other hand, since many of magnetic fluxes flowing to the rotor flow in the vicinity of its periphery, the total cross section St of winding slots can be increased when providing an armature also in the inside of the rotor. The technique of providing armatures inside and outside a rotor is introduced in, for example, Japanese Patent Application Laid-Open Nos. 2002-335658, 2002-369467, 2002-84720 and 9-56126.

It is however considered that the saliency of magnetic resistance cannot be utilized in the structure shown in Japanese Patent Application Laid-Open Nos. 2002-335658, 2002-369467 and 2002-84720, and in the structure shown in Japanese Patent Application Laid-Open No. 9-56126, an armature inside a rotor having field magnets is also a rotor, which is therefore considered difficult to make effective use of the reluctance torque of the rotor having the field magnets.

Japanese Patent Application Laid-Open No. 09-233887 proposes a technique of carrying out field weakening without flowing a field weakening current.

To increase the q-axis inductance Lq, it is possible to make the positions where permanent magnets are embedded close to the central axis of a rotor. This increases the volume of a rotor core positioned on outer side than the permanent magnets and increases the q-axis inductance Lq.

However, making the positions where permanent magnets are embedded close to the central axis of the rotor reduces the surface area of pole in the case where the rotor has a constant outer diameter, which contradicts the measure (iv). Further, it is difficult to employ the device of increasing the efficiency of a motor per volume by providing a stator also inside the rotor.

SUMMARY OF THE INVENTION

The present invention provides a technique of increasing the efficiency of a motor per volume.

A first aspect of a magnetic member (100) according to this invention comprises an outer periphery (100a) and an inner periphery (100b), each being annular, and is divided into first portions (11 to 14) and second portions (15 to 18) alternately in a circumferential direction, wherein said first portions respectively have holes (41 to 44) extending almost in said circumferential direction, and said first portions and said second portions are magnetically separated in said circumferential direction.

A second aspect of the magnetic member (100) according to this invention is the first aspect of the magnetic member, further comprising gaps (21 to 28; 241, 251) provided at both ends of said holes (41 to 44) in said circumferential direction between said outer periphery (100a) and said inner periphery (100b). Said first portions (11 to 14) and said second portions (15 to 18) are magnetically separated by said gaps in said circumferential direction.

A third aspect of the magnetic member (100) according to this invention is the second aspect of the magnetic member, in which said gaps (21 to 28; 241, 251) extend from the side of said outer periphery (100a) of said holes (41 to 44) to the side of said inner periphery (100b).

A fourth aspect of the magnetic member (100) according to this invention is the first to third aspects of the magnetic member, in which said holes (41 to 44) are provided one each for each of said first portions (11 to 14).

A fifth aspect of the magnetic member (100) according to this invention is the first to fourth aspects of the magnetic member, in which said second portions (15 to 18) are further provided with holes (51 to 54).

A sixth aspect of the magnetic member (100) according to this invention is the fifth aspect of the magnetic member, in which said holes (51 to 54) are circular.

A first aspect of a rotor (101) according to this invention comprises: the magnetic member (100) of the first aspect; and field magnets (31 to 34) respectively inserted into said holes (41 to 44) and each exhibiting pole faces different from each other toward said outer periphery (100a) and said inner periphery (100b).

A first aspect of a motor according to this invention comprises: the rotor (101) of the first aspect; an inner peripheral side stator (200) provided on the side of said inner periphery (100b) with respect to said rotor of the first aspect; and an outer peripheral side stator (300) provided on the side of said outer periphery (100a) with respect to said rotor.

A second aspect of the rotor (101) according to this invention comprises: the magnetic member (100) of the second to sixth aspects; and field magnets (31 to 34) respectively inserted into said holes (41 to 44) and each exhibiting pole faces different from each other toward said outer periphery (100a) and said inner periphery (100b).

A second aspect of the motor according to this invention comprises: the rotor (101) of the second aspect; an inner peripheral side stator (200) provided on the side of said inner periphery (100b) with respect to said rotor of the second aspect; and an outer peripheral side stator (300) provided on the side of said outer periphery (100a) with respect to said rotor.

A third aspect of the motor according to this invention is the motor of the second aspect, in which a width (61) of said gaps (21 to 28; 241, 251) is larger than twice the larger one of a first distance (62) between said inner periphery (100b) and said inner peripheral side stator (200) and a second distance (63) between said outer periphery (100a) and said outer peripheral side stator (300).

A fourth aspect of the motor according to this invention is the motor of the first to third aspects, in which relative positional relationship in said circumferential direction between the center in said circumferential direction of a teeth section (201) provided for said inner peripheral side stator (200) and the center in said circumferential direction of a teeth section (301) provided for said outer peripheral side stator (300) is variable.

A compressor according to this invention is equipped with the motor of the first to fourth aspects.

A compressor according to this invention is equipped with the motor of the first to fourth aspects.

An air conditioner according to this invention comprises at least one of the compressor according to this invention and the blower according to this invention.

A vehicle-mounted air conditioner according to this invention comprises a compressor equipped with the motor of the fourth aspect.

According to the first aspect of the magnetic member of this invention, the field magnets are inserted into the holes in the magnetic member alone or in a stack of a plurality of them, and an interior permanent magnet type rotor can thereby be structured. Since the second portions are provided alternately relative to the first portions in the circumferential direction while being magnetically separated, so-called q-axis inductance can be increased. Further, providing stators inside and outside the rotor, respectively, can increase the total cross section of winding slots, which can contribute to the structure of a motor having high efficiency per volume.

According to the second or third aspect of the magnetic member of this invention, since the gaps have high magnetic resistance, they contribute to magnetic separation between the first portions and second portions, and also prevent short circuiting of magnetic fluxes between a pair of pole faces exhibited by the field magnets inserted into the holes. Accordingly, the flow of magnetic fluxes to/from outside through the outer periphery and inner periphery is increased.

According to the fourth aspect of the magnetic member of this invention, the magnetic member is formed smaller without impairing the mechanical strength, as compared to a structure in which a plurality of holes are provided for each of the first portions, which contributes to size reduction of a motor which employs a rotor obtained by inserting field magnets into the holes of the magnetic member. Further, magnetization is easier and the problem of demagnetization is smaller, as compared to the case of inserting a field magnet into each of a plurality of holes provided for each of the first portions.

According to the fifth aspect of the magnetic member of this invention, fastening members such as bolts or rivets, for example, may be inserted into the holes, and the use of them permits fastening of the magnetic members to each other, or further, the end plate as well. Further, if the first portions are provided with holes, they block the flow of not only the q-axis fluxes contributing to the reluctance torque but also the d-axis fluxes contributing to the magnet torque, even when using a magnetic member for the fastening members to be inserted therein. In contrast, by providing the second portions with holes, the flow of d-axis fluxes is less likely to be blocked even though the flow of q-axis fluxes may be blocked.

According to the sixth aspect of the magnetic member of this invention, the holes necessary for obtaining a desired mechanical strength have a small size, so that the block of fluxes by the holes is lessened. Further, the configuration that the magnetic member extends toward either of the outer periphery and inner periphery is obtained in the second portions, which makes the q-axis fluxes to be likely to flow between the stators and second portions.

According to the first or second aspect of the rotor of this invention, since the second portions are provided alternately relative to the first portions in the circumferential direction while being magnetically separated, so-called q-axis inductance can be increased. Further, stators can be provided inside and outside the rotor, respectively, which contributes to the structure of a motor, in which the total cross section of winding slots is increased.

According to the first or second aspect of the motor of this invention, the q-axis inductance is increased, and the total cross section of winding slots is increased.

According to the third aspect of the motor of this invention, magnetic fluxes are more likely to flow to the inner peripheral side stator and outer peripheral side stator, rather than flowing inside the rotor across the gaps, so that the magnet torque can be increased.

According to the fourth aspect of the motor of this invention, a component of magnetic fluxes obtained from field magnets that flows in the circumferential direction passing through the rotor side of the teeth section of the inner peripheral side stator or the rotor side of the teeth section of the outer peripheral side stator is increased, so that weakening field can be achieved equivalently without controlling an armature current in the stators. Therefore, increase in copper loss due to a flux weakening current or demagnetization of field magnets due to a negative d-axis current does not occur. Adjustment of such relative positional relationship, is easier to control finely as compared to adjustment of the number of turns of windings, which can be employed in common for motors different in number of revolutions to be set.

A compressor, a blower and an air conditioner according to the present invention achieve high efficiency in compression, blowing and air conditioning, respectively.

A vehicle-mounted air conditioner according to the present invention facilitates fine adjustment of the number of revolutions even when operating at low voltages.

These and other objects, features, aspects and advantages of the present invention will become more apparent from the following detailed description of the present invention when taken in conjunction with the accompanying drawings.

BEST MODE FOR CARRYING OUT THE INVENTION

Detailed Description of the Invention

For simplicity, description will be made below taking the case where the pole pair number of a rotor is 2 and phase number of a stator is 3 as an example, however, the present invention is applicable to other pole pair numbers and phase numbers.

Figure 1:
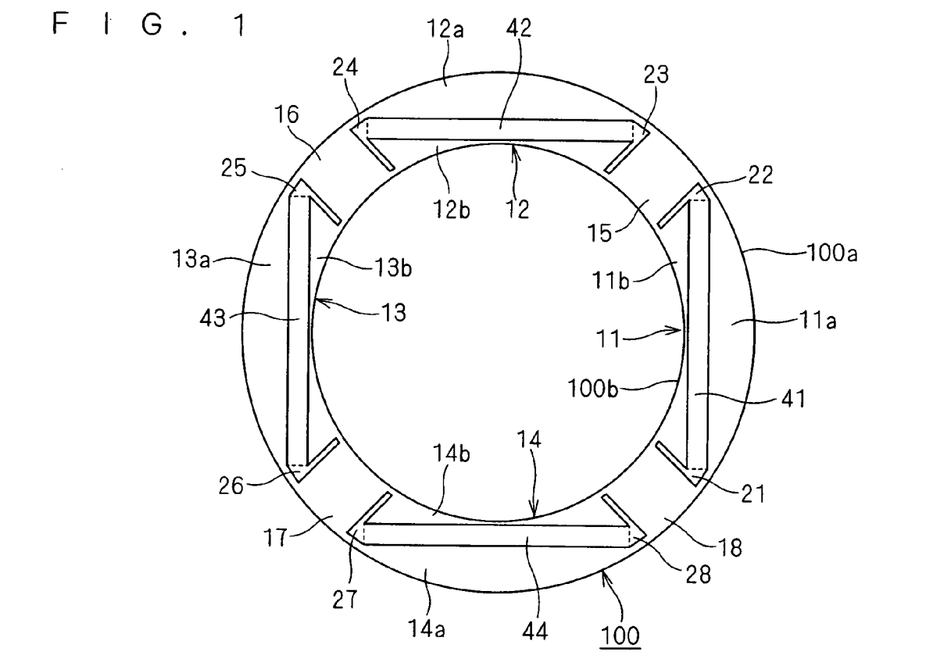
FIG. 1 is a plan view showing the structure of a magnetic member according to a first embodiment of the present invention.

FIG. 1 is a plan view showing the structure of a magnetic member 100 according to a first embodiment of the present invention. The magnetic member 100 can contribute to an interior permanent magnet type rotor, as will be described later. Further, the magnetic member 100 may extend in the direction perpendicular to the sheet of drawing, or may be thin in the direction perpendicular to the sheet of drawing. In the former case, it may be formed of, for example, dust core to be employed as the core of a rotor. In the latter case, it may be formed employing, for example, steel sheets, which are stacked one upon another to be employed as the core of a rotor. In that case, FIG. 1 can be understand as a sectional view of that core.

The magnetic member 100 has an outer periphery 100a and an inner periphery 100b, and they each show an annular shape. While the both show concentric circles here, they do not necessarily need to be perfect circles, and design variations may be made according to necessity.

Since it is possible to provide a stator on each side of the inner periphery 100b and outer periphery 100a, the magnetic member 100 can contribute to the structure of a motor in which the total cross section of winding slots of stators is increased.

The magnetic member 100 is divided into first portions 11 to 14 and second portions 15 to 18 alternately in its circumferential direction. The first portions 11 to 14 and second portions 15 to 18 are magnetically separated in the circumferential direction. Here, a mode in which they are magnetically separated by gaps 21 to 28 is illustrated, in which magnetic fluxes are blocked from flowing in the circumferential direction between the first portion 11 and second portion 15, for example.

The first portions 11 to 14 respectively have holes 41 to 44 each extending almost in the circumferential direction. The aforementioned gaps 21 to 28 are provided at both ends of the holes 41 to 44 in the circumferential direction between the outer periphery 100a and inner periphery 100b. Specifically, the gaps 21 and 22 are provided at ends of the hole 41, gaps 23 and 24 are provided at ends of the hole 42, gaps 25 and 26 are provided at ends of the hole 43, and gaps 27 and 28 are provided at ends of the hole 44.

The first portion 11 is divided into an outer peripheral portion 11a closer to the outer periphery 100a with respect to the hole 41 and an inner peripheral portion 11b closer to the inner periphery 100b. Similarly, the first portion 12 is divided into an outer peripheral portion 12a closer to the outer periphery 100a with respect to the hole 42 and an inner peripheral portion 12b closer to the inner periphery 100b, the first portion 13 is divided into an outer peripheral portion 13a closer to the outer periphery 100a with respect to the hole 43 and an inner peripheral portion 13b closer to the inner periphery 100b, and the first portion 14 is divided into an outer peripheral portion 14a closer to the outer periphery 100a with respect to the hole 44 and an inner peripheral portion 14b closer to the inner periphery 100b.

Figure 2:
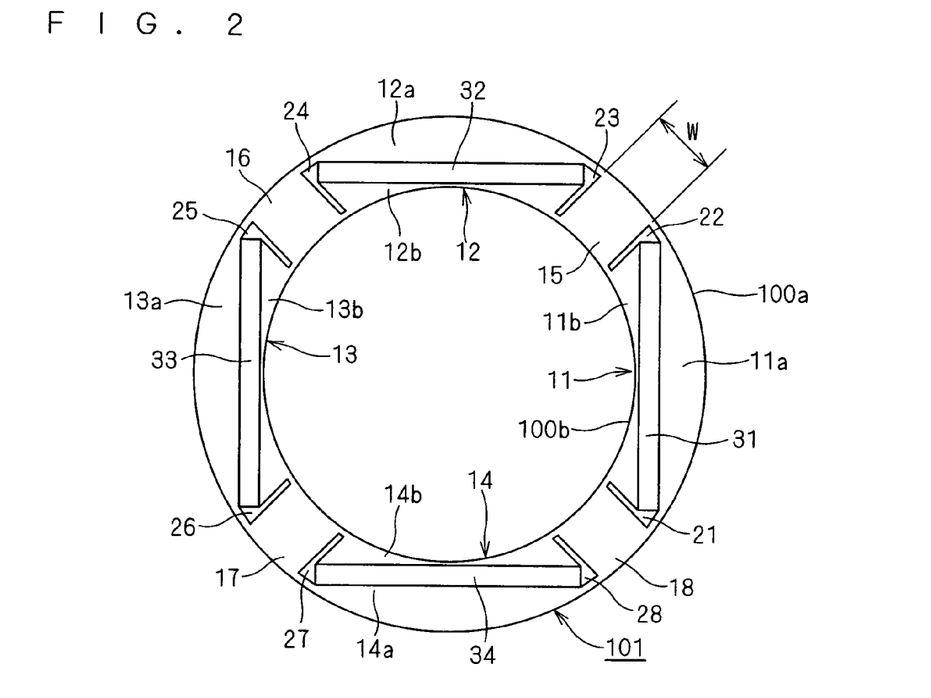
FIG. 2 is a sectional view showing the structure of a rotor according to the first embodiment.

FIG. 2 is a sectional view showing a cross section perpendicular to the rotation axis in the structure of a rotor 101 according to the first embodiment. The rotor 101 is structured by inserting field magnets 31 to 34 each exhibiting pole faces different from each other toward the outer periphery 100a and the inner periphery 100b, respectively, into the holes 41 to 44. Further, since the structure in which the pole pair number is 2 is illustrated, adjacent ones of the field magnets 31 to 34 exhibit pole faces of different polarities from each other toward the outer periphery 100a.

In the above manner, the field magnets 31 to 34 are inserted into the holes 41 to 44 in the magnetic member 100 or in a stack of a plurality of them, so that the interior permanent magnet type rotor 101 can be structured. Since the second portions 15 to 18 are provided alternately relative to the first portions 11 to 14 while being magnetically separated in the circumferential direction, magnetic fluxes flow to the second portions 15 to 18 through a stator (which will be described later) provided inside the rotor 101, and further, the width W of the second portions 15 to 18 in the circumferential direction can be increased. The q-axis inductance Lq can thereby be increased.

Figure 3:
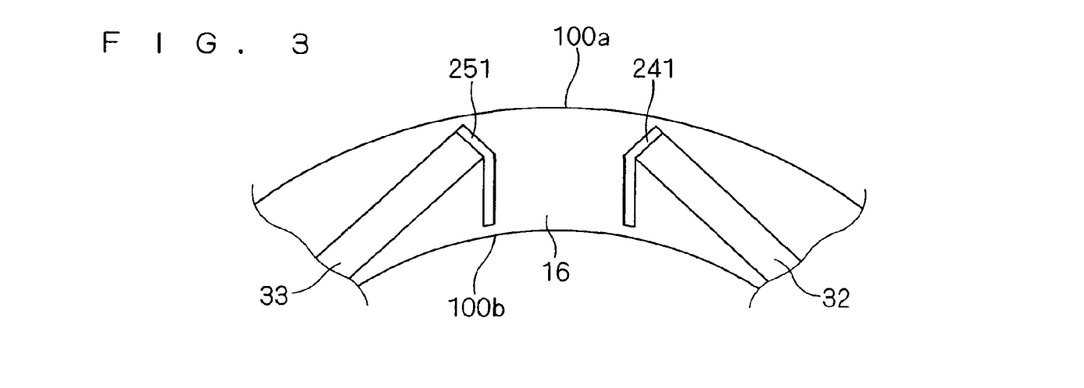
FIG. 3 is a partial sectional view illustrating gaps.

FIGS. 1 and 2 illustrate the mode in which the width of the gaps 21 to 28 in the circumferential direction is wider on the side of the outer periphery 100a than on the side of the inner periphery 100b, however, widening is not necessarily required. FIG. 3 is a partial sectional view illustrating gaps 241 and 251 as a modification of the gaps 24 and 25. The gaps 241 and 251 may be bent.

The gaps 21 to 28 have thin portions on either the outer periphery 100a or inner periphery 100b, however, if the mechanical strength of the rotor 101 permits, the gaps 21 to 28 may extend through to either the outer periphery 100a or inner periphery 100b. Even if they extend through to both sides, the first portions 11 to 14 and second portions 15 to 18 may be connected by providing end plates separately.

Conversely, the gaps 21 to 28 do not necessarily need to be provided continuously between the outer periphery 100a and inner periphery 100b. The gaps 21 to 28 may be disconnected leaving thin portions to a degree that the second portions 15 to 18 are magnetically separated from the first portions 11 to 14 in the circumferential direction.

The gaps 21 to 28 have high magnetic resistance, and therefore contribute to the magnetic separation between the first portions 11 to 14 and second portions 15 to 18, and also prevents magnetic fluxes from short circuiting between a pair of pole faces exhibited by each of the field magnets 31 to 34 inserted into the holes 41 to 44. Accordingly, the flow of magnetic fluxes to/from outside, i.e., stators through the outer periphery 100a and inner periphery 100b can be increased. It is therefore desirable that the gaps 21 to 28, 241 and 251 extend from the side of the outer periphery 100a toward the inner periphery 100b of the holes 41 to 44.

It is desirable that the holes 41 to 44 be provided one each for each of the first portions 11 to 14. As compared to the structure in which a plurality of holes are provided for each of the first portions 11 to 14, the magnetic member 100 can be formed smaller without impairing the mechanical strength, which contributes to size reduction of a motor which employs a rotor obtained by inserting field magnets into the holes. Further, the problem of demagnetization is smaller as compared to the case of providing a plurality of holes for each of the first portions 11 to 14 and inserting a field magnet into each of the holes. In addition, it is also possible to embed a magnetic material into the holes and then magnetize it to obtain field magnets, however, magnetization is easier as compared to the case in which a plurality of holes exist in the first portions 11 to 14.

Figure 4:
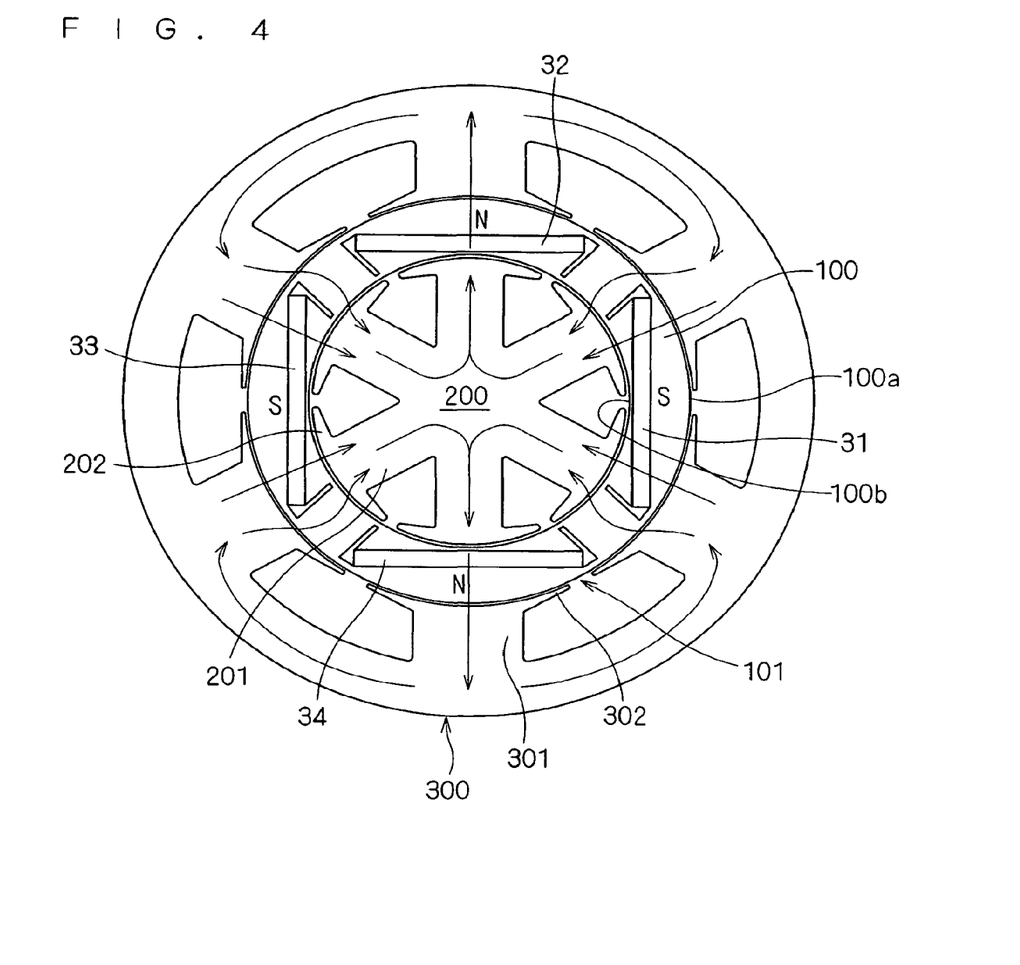
FIG. 4 is a sectional view illustrating the structure of a motor according to the present invention.

FIG. 4 is a sectional view illustrating the structure of a motor in which the rotor 101 is used. It has a structure in which an inner peripheral side stator 200 is provided on the side of the inner periphery 100b of the rotor 101 and an outer peripheral side stator 300 is provided on the side of the outer periphery 100a. As described above, providing stators inside and outside the rotor 101 can increase the total cross section of winding slots.

The outer peripheral side stator 300 has teeth sections 301 extending in the radial direction, and their tips (on the side of the rotor 101) extend in the circumferential direction to form widened portions 302. Similarly, the inner peripheral side stator 200 has teeth sections 201 extending in the radial direction, and their tips (on the side of the rotor 101) extend in the circumferential direction to form widened portions 202.

For simplicity, FIG. 4 is depicted with armature windings omitted. Magnetic fluxes flow between the rotor 101 and outer peripheral side stator 300 mainly through the teeth sections 301, and magnetic fluxes flow between the rotor 101 and inner peripheral side stator 200 mainly through the teeth sections 201.

FIG. 4 illustrates the flow of magnetic fluxes caused by the field magnets 31 to 34 in the case where the field magnets 31 and 33 exhibit pole faces of S pole and the field magnets 32 and 34 exhibit pole faces of N pole, respectively, toward the outer peripheral side stator 300.

Figure 5:
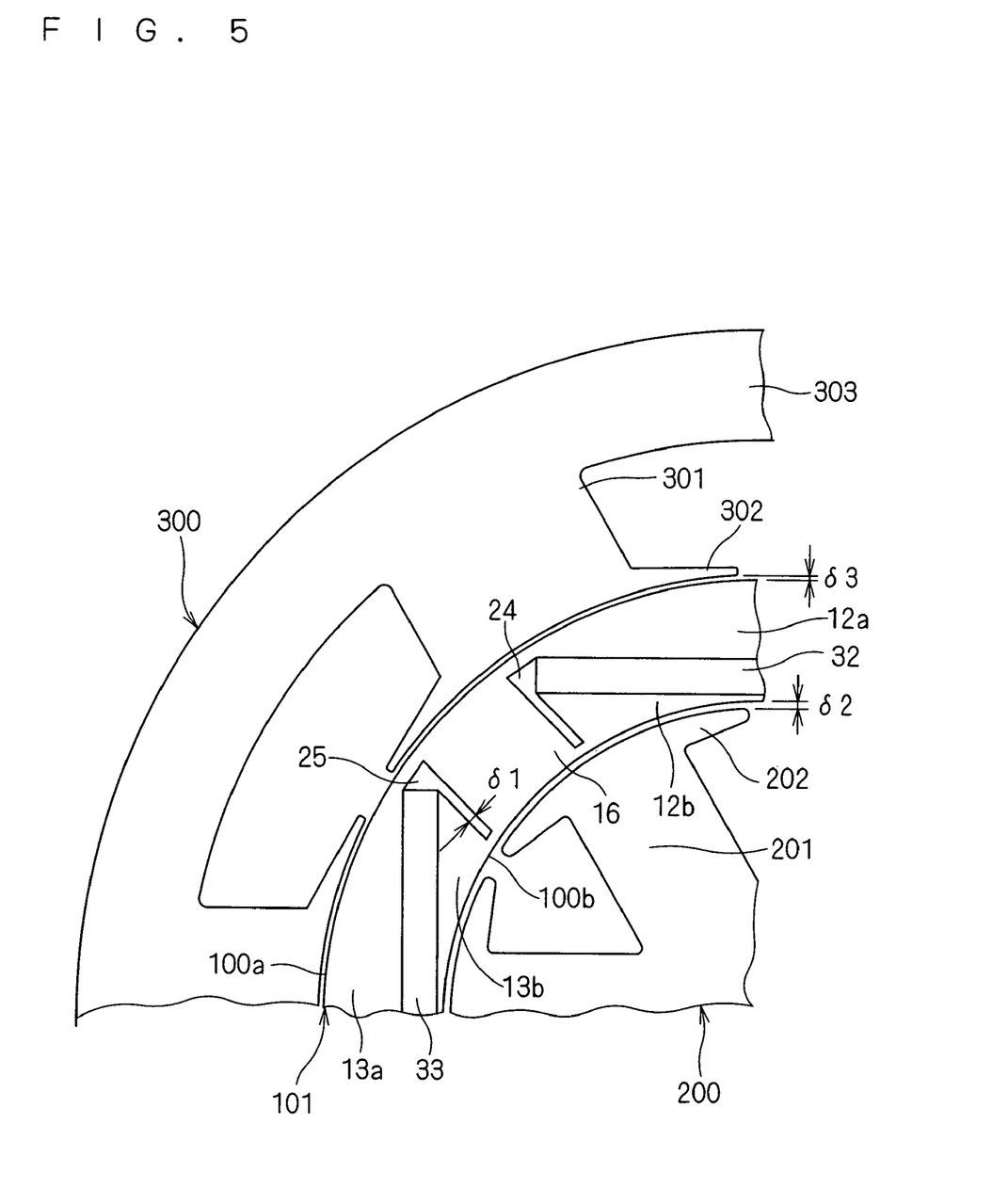
FIG. 5 is a sectional view partially showing the structure of the motor.

FIG. 5 is a partial sectional view magnifying the rotor 101, inner peripheral side stator 200, and outer peripheral side stator 300. The rotor 101 is provided with the inner peripheral side stator 200 and outer peripheral side stator 300 leaving a first distance $\delta 2$ from the inner periphery 100b and a second distance $\delta 3$ from the outer periphery 100a, respectively.

It is desirable that the width 61 of the gaps 21 to 28, 241 and 251 be larger than twice the larger one of the first distance 62 and second distance 63. This is to increase the magnetic resistance between the first portions 11 to 14 and second portions 15 to 18 in the circumferential direction than the magnetic resistance between the rotor 101, inner peripheral side stator 200 and outer peripheral side stator 300, thereby promoting the flow of magnetic fluxes between the rotor and stators.

Figure 6:
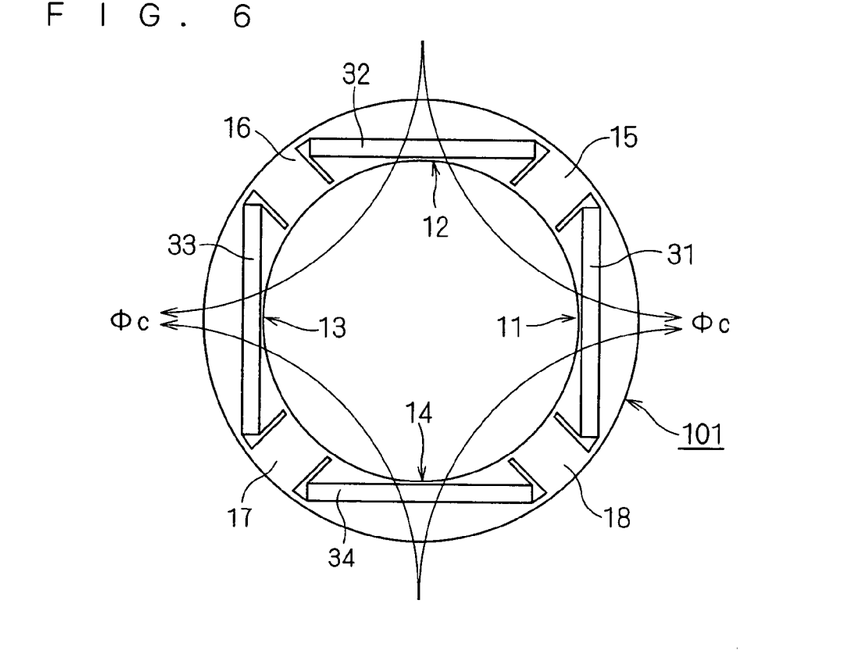
FIG. 6 is a diagram conceptually showing the manner in which d-axis fluxes flow in the rotor.
Figure 7:
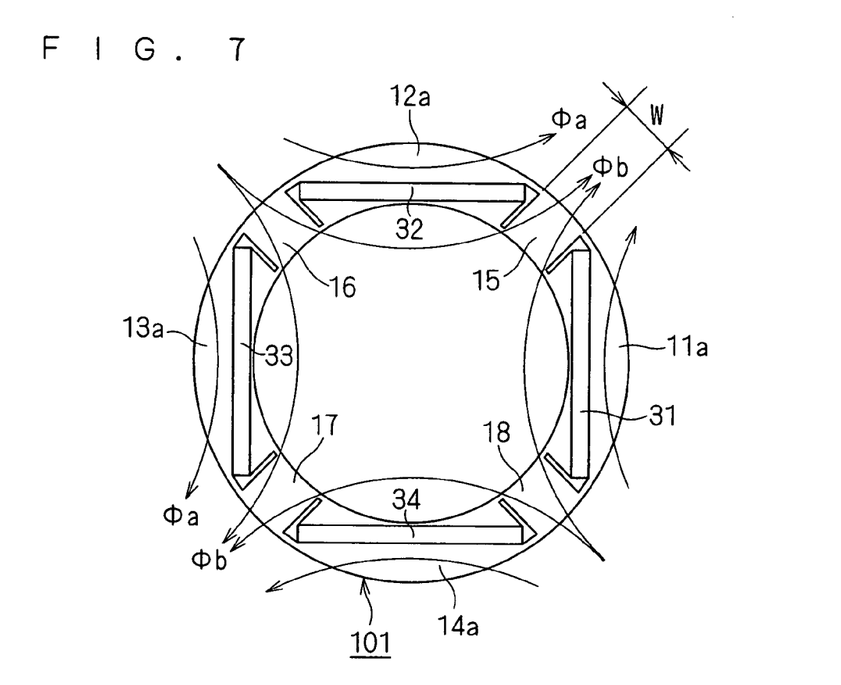
FIG. 7 is a diagram conceptually showing the manner in which q-axis fluxes flow in the rotor.

FIG. 6 is a diagram conceptually showing the manner in which d-axis fluxes φc flow in the rotor 101, and FIG. 7 is a diagram conceptually showing the manner in which q-axis fluxes φa and φb flow in the rotor 101, both of which correspond to the sectional view of FIG. 2.

The d-axis fluxes φc flow between the field magnets 31, 33 and field magnets 32, 34. Thus, the d-axis fluxes φc flow substantially merely through the first portions 11 to 14.

The q-axis fluxes φ a flow through the first portions 11 to 14, and more specifically, through the outer peripheral portions 11a, 12a, 13a and 14a. Further, the q-axis fluxes φb flow through the second portions 15 to 18. It is therefore desirable to widen the width W of the second portions 15 to 18 in the circumferential direction in terms of increasing the q-axis inductance Lq.

Here, if the second portions 15 to 18 are not magnetically separated from the first portions 11 to 14 in the circumferential direction, for example, if there is no separation on the side of the inner periphery 100b, the second portions 15 to 18 serve as yokes of the field magnets 31 to 34 with respect to the outer peripheral side stator 300 along with the first portions 11 to 14, which will reduce the number of flux linkage with the inner peripheral side stator 200. This will reduce the magnet torque even though the width W of the second portions 15 to 18 in the circumferential direction can be widened to increase the q-axis inductance Lq, thereby increasing the reluctance torque.

In the present invention, however, since the second portions 15 to 18 are provided alternately relative to the first portions 11 to 14 while being magnetically separated in the circumferential direction, magnetic fluxes produced by the field magnets 31 to 34 are prevented from short circuiting inside the rotor 101 as shown in FIG. 4 even when widening the width W. That is, the width W of the second portions 15 to 18 in the circumferential direction can be widened to increase the q-axis inductance Lq without reducing magnetic fluxes linked with the inner peripheral side stator 200 and outer peripheral side stator 300.

Of course, in the present embodiment, the total cross section of winding slots may further be increased along with devices of slot configuration as introduced in Patent documents 1 and 2.

The inner peripheral side stator 200 is an armature with windings (omitted from illustration) wound therearound, but it is more desirable that it be not a rotor. If the armature inside the rotor 101 is a rotor, a mechanical commutator is required as described above, and in addition, it rotates relative to the outer peripheral side stator 300 which is an outer armature. This relative rotation reduces the relative number of revolutions of either armature relative to the field of the rotor 101, resulting in degraded efficiency of the motor. This relative rotation also disturbs the paths of the q-axis fluxes φb, increasing fluctuations in reluctance torque, which makes it difficult to utilize it.

Figure 8:
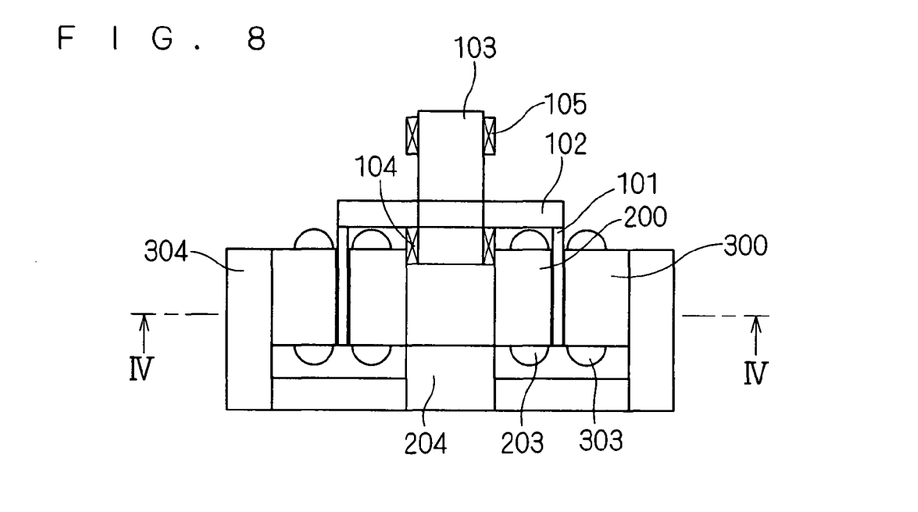
FIG. 8 is a sectional view showing the structure of the motor.

FIG. 8 is a sectional view of the motor provided with the rotor 101, inner peripheral side stator 200 and outer peripheral side stator 300, and conceptually shows the cross section including the center of rotation. The rotor 101 is connected to a rotation shaft 103 with an end plate 102 interposed therebetween, and the rotation shaft 103 is supported by bearings 104 and 105. The inner peripheral side stator 200 and outer peripheral side stator 300 are supported by supporting parts 204 and 304, respectively. Further, armature windings 203 and 303 are wound around the inner peripheral side stator 200 and outer peripheral side stator 300, respectively. FIG. 4 corresponds to the cross section in a position IV-IV in FIG. 8 with the supporting parts 204, 304 and armature windings 203, 303 omitted.

Figure 9:
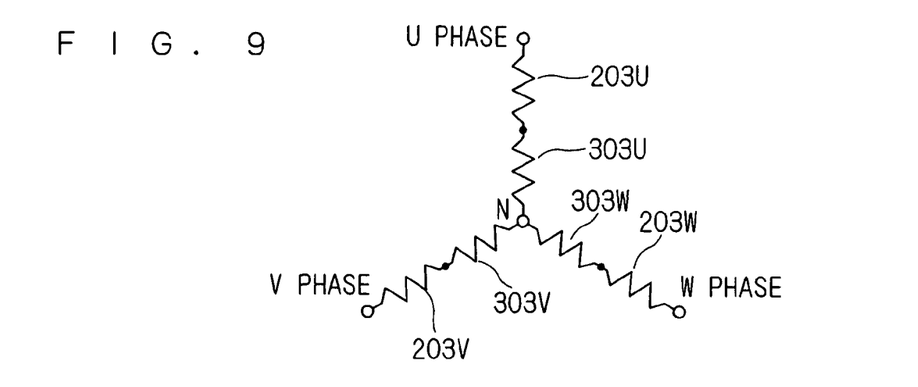
FIGS. 9 through 12 are circuit diagrams each showing a mode in which armature windings are connected.
Figure 10:
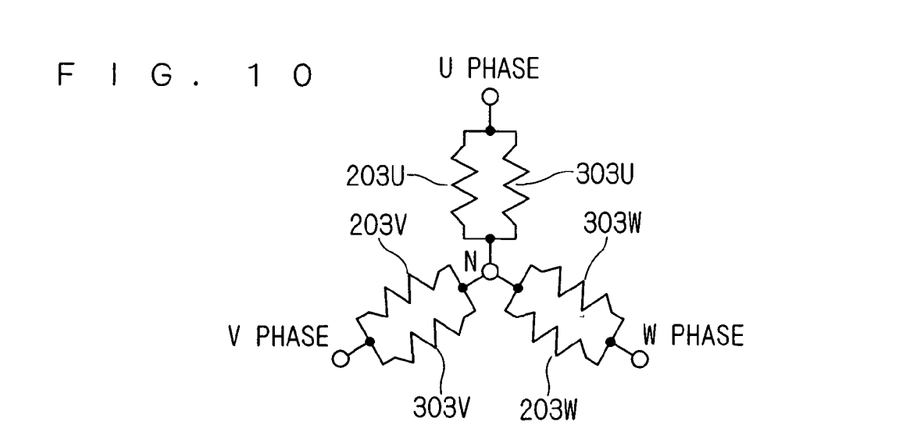

FIGS. 9 and 10 are circuit diagrams illustrating a mode in which the armature windings 203 and 303 (FIG. 8) are connected. Coils 203U, 203V and 203W shown in FIGS. 9 and 10 are U-phase, V-phase and W-phase coils of the armature winding 203, respectively, and coils 303U, 303V and 303W are U-phase, V-phase and W-phase coils of the armature winding 303, respectively.

FIGS. 9 and 10 show the cases in which the armature windings 203 and 303 are connected in series and parallel in each phase, respectively. In the present embodiment, either mode of series connection and parallel connection may be employed.

Figure 11:
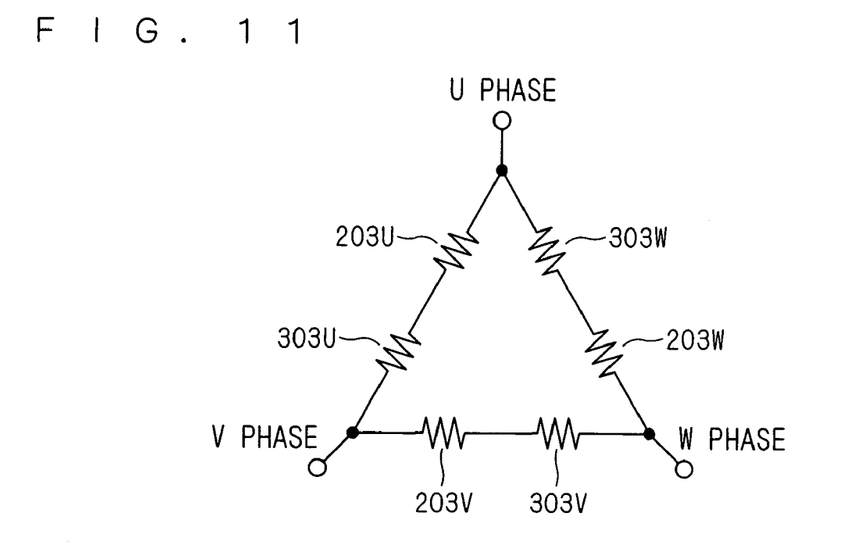
Figure 12:
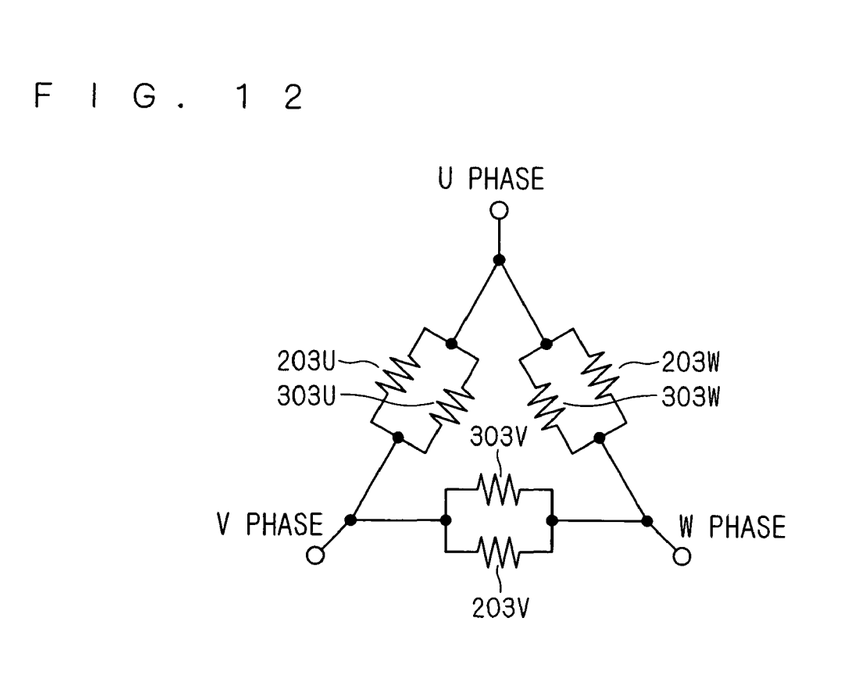

FIGS. 9 and 10 show the cases in which the armature windings 203 and 303 are connected in series and parallel in each phase, respectively, employing star connection. In the present embodiment, either mode of series connection and parallel connection may be employed. Of course, as shown in FIGS. 11 and 12, the armature windings 203 and 303 are connected in series and parallel in each phase, respectively, employing delta connection. However, since the employment of delta connection causes a ring current caused by unbalance between induced voltages to increase copper loss, it is desirable that star connection be employed to connect the armature windings 203 and 303 in series in each phase.

Second Embodiment

Figure 13:
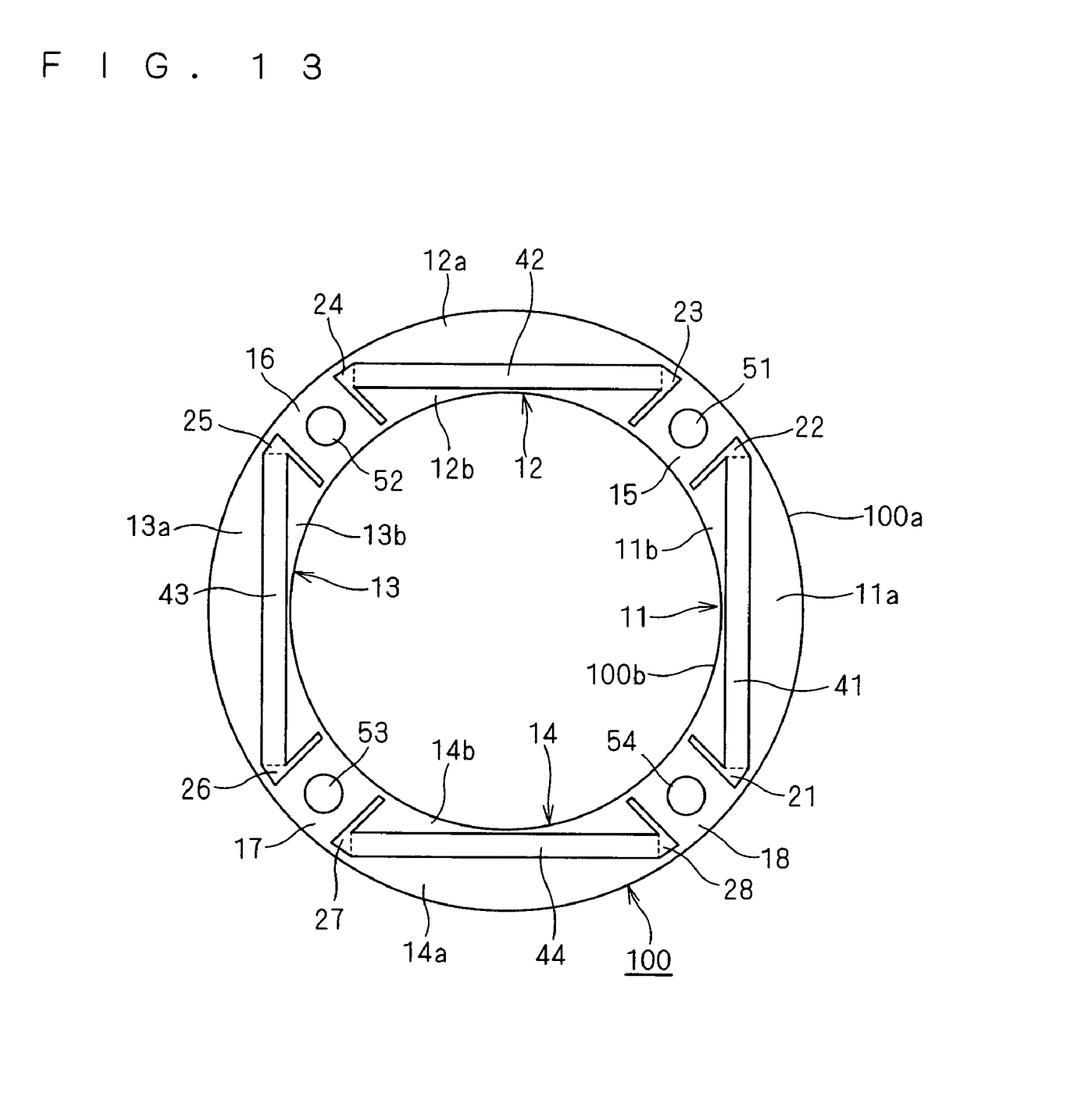
FIG. 13 is a plan view showing the structure of a magnetic member according to a second embodiment of the present invention.

FIG. 13 is a plan view showing the structure of a magnetic member 100 according to a second embodiment of the present invention. The second portions 15 to 18 are further provided with holes 51 to 54, respectively, in the magnetic member 100 shown in FIG. 1.

Fastening members such as bolts or rivets, for example, may be inserted into the holes 51 to 54, and the use of them permits simple and inexpensive fastening of magnetic members 100 to each other or further, the end plate 102 (cf. FIG. 8) as well. If the magnetic members 100 are to be connected to each other using an adhesive, adhering and hardening time is required, and the use environments of the motor, particularly, temperature environments are limited. In the present embodiment, however, such problem can be avoided.

If the first portions 11 to 14 are provided with holes, they block the flow of not only the q-axis fluxes φa (FIG. 7) contributing to the reluctance torque but also the d-axis fluxes φc (FIG. 6) contributing to the magnet torque, even when using a magnetic member for the fastening members to be inserted therein. In contrast, by providing the second portions 15 to 18 with the holes 51 to 54, the flow of d-axis fluxes φc are less likely to be blocked even though the flow of q-axis fluxes φb may be blocked.

As already described, since the second portions 15 to 18 are provided alternately relative to the first portions 11 to 14 while being magnetically separated in the circumferential direction, the width W is easy to be widened. Thus, there are spaces in the area for providing the holes 51 to 54, and the holes 51 to 54 can be enlarged. Further, even when providing the holes 51 to 54, the flow of q-axis fluxes φb is blocked, but is easy to be secured to some degree.

Preferably, the holes 51 to 54 are circular. In this case, there is no angle to which stress concentrates, and portions serving as ribs other than the holes can be thickened, causing the holes 51 to 54 necessary for obtaining a desired mechanical strength to be reduced in size, so that the block of q-axis fluxes φb by the holes 51 to 54 can be lessened.

Since the shape that the magnetic member extends toward either of the outer periphery 100*a* and inner periphery 100*b* can be obtained in the second portions 15 to 18, the q-axis fluxes φb are more likely to flow between the stators 200, 300 (cf. FIG. 4) and second portions 15 to 18.

Of course, it is desirable to employ a magnetic material for the fastening members to be inserted into the holes 51 to 54 in order to reduce the above-mentioned block of the magnetic fluxes.

Third Embodiment

Figure 14:
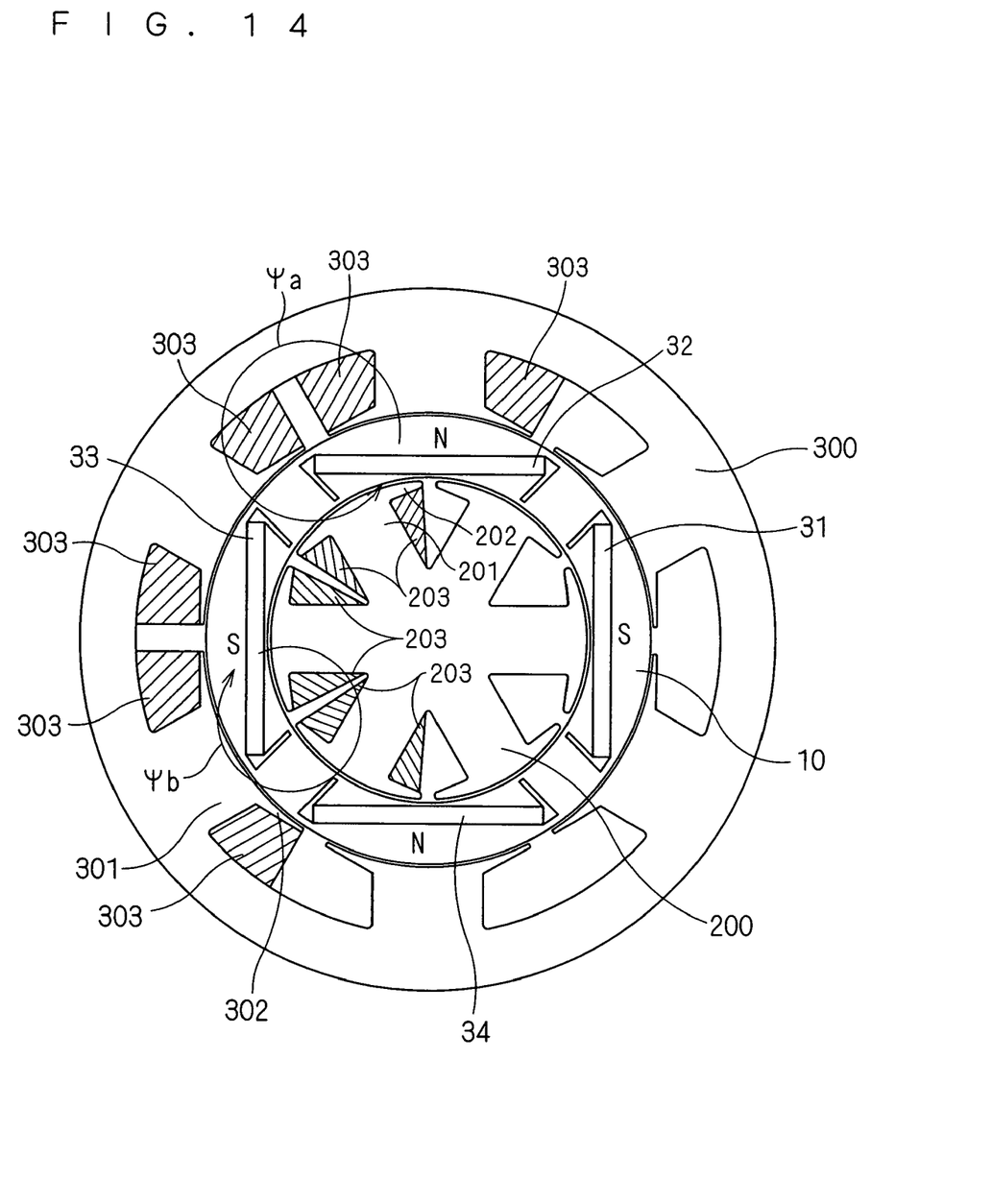
FIG. 14 is a sectional view showing the structure of a motor according to a third embodiment of the present invention.

FIG. 14 is a sectional view showing the structure of a motor according to a third embodiment of the present invention. As compared to the structure shown in FIG. 4, the center in the circumferential direction of the teeth sections 201 of the inner peripheral side stator 200 and the center in the circumferential direction of the teeth sections 301 of the outer peripheral side stator 300 are displaced in relative position in the circumferential direction. FIG. 14 illustrates the case of a displacement of 30 degrees as a mechanical angle, which corresponds to a displacement of 60 degrees as an electric angle. For simplicity, only those of the armature windings 203 and 303 that are wound around some of the teeth sections 201 and 301 are depicted.

Such displacement may be mechanically carried out prior to usage or during use of the motor. For instance, the displacement may be carried out manually prior to usage of the motor, or the displacement may be carried out by an actuator such as a servomotor during use. This actuator can be provided in, for example, the supporting part 204 shown in FIG. 8.

A magnetic flux Ψa indicates a magnetic flux generated from a pole face (here, N pole) of the magnet 32 on the outer peripheral side, and a magnetic flux Ψb indicates a magnetic flux generated from the pole face (here, S pole) of the magnet 33 on the outer peripheral side.

With the above-mentioned displacement produced, when the magnetic flux Ψa returns to a pole face of the magnet 32 on the inner peripheral side, there exists a path which passes through the teeth sections 301 to the yoke of the outer peripheral side stator 300 to be linked with the armature winding 303, but passes through a widened portion 202 without being linked with the armature winding 203 in the teeth section 201 of the inner peripheral side stator 200. Similarly, when the magnetic flux Ψb returns to a pole face of the magnet 33 on the inner peripheral side, there exists a path which passes through the teeth section 201 to the yoke of the inner peripheral side stator 200 to be liked with the armature winding 203, but passes through a widened portion 302 without being linked with the armature winding 303 in the teeth section 301 of the outer peripheral side stator 300.

These paths substantially weaken the fields of the magnets 32 and 33. That is, the aforementioned displacement mechanically achieves flux weakening control which is substantial field weakening control. In this manner, flux weakening control can be achieved without flowing a flux weakening current, which achieves improved efficiency in a high output region. FIG. 14 shows a displacement corresponding to 60 degrees as an electric angle, and illustrates the case of making the most effective use of flux weakening.

According to this embodiment, increase in copper loss due to flux weakening current or demagnetization of field magnets due to a negative d-axis current does not occur. Further, adjustment of relative positional relationship is easier to control finely as compared to adjustment of the number of turns of windings, which can be employed in common for motors different in number of revolutions to be set.

Since the magnetic flux densities at the widened portions 202 and 302 of the teeth sections increase at the time of flux weakening control, the iron loss at the widened portions 202 and 302 increases. However, the density of magnetic fluxes passing through the teeth sections 201 and 301 other than the widened portions 202 and 302 decreases, which can reduce the iron loss in a longer magnetic path, so that the total iron loss in the motor is reduced.

In this manner, carrying out flux weakening control by adjusting the mutual positional relationship between the outer and inner armatures is suitable particularly in the case of reducing the motor in size. In Patent document 7, for example, plugs for adjustment are embedded in a stator utilizing permeability anisotropy according to the rolling direction of grain-oriented electrical steel sheet. However, this impairs the magnetic flux density of the stator itself, which is therefore not desirable in terms of size reduction of the motor.

Further, the motor according to the present embodiment facilitates fine adjustment of the number of revolutions even by using the same current, which is suitable in the case where the motor operates at low voltages. In a motor operating at low voltages, the number of turns of windings is small, so that changing the number of turns for performing fine adjustment is not easy. This is because the change in the number of turns is discrete numerical control.

The motor according to the present embodiment permits fine adjustment of the number of revolutions without depending on the number of turns, which is therefore suitable for a compressor for a vehicle-mounted air conditioner operating at low voltages of, e.g., 42V or below.

Of course, a compressor or a blower of a typical air conditioner may be equipped with the motor according to the present embodiment to improve the efficiency in compression and blowing. Accordingly, an aid conditioner equipped with at least one of such compressor and blower can be improved in air conditioning efficiency.

Since carrying out flux weakening control induces a loss resulting from a ring current caused by unbalance between induced voltages, the series connection as shown in FIG. 9 is more desirable.

Further, the magnetic member 100 may have the holes 51 to 54, as shown in the second embodiment.

While the invention has been shown and described in detail, the foregoing description is in all aspects illustrative and not restrictive. It is therefore understood that numerous modifications and variations can be devised without departing from the scope of the invention.

What is claimed is:

1. A magnetic member with an annular outer periphery and an annular inner periphery comprising:
    first portions and second portions alternately disposed in a circumferential direction,
        said first portions respectively having holes extending almost in said circumferential direction, and
        said first portions and said second portions being magnetically separated in said circumferential direction; and
    gaps provided at both ends of said holes in said circumferential direction between said outer periphery and said inner periphery,
    said first portions and said second portions being magnetically separated by said gaps in said circumferential direction said gaps extending elongately from an adjacent region of said annular outer periphery of said holes to an adjacent region of said annular inner periphery of said holes.

2. The magnetic member according to claim 1, wherein each of said first portions has one of said holes.

3. The magnetic member according to claim 1, wherein said second portions are further provided with holes.

4. The magnetic member according to claim 3, wherein said second portions' holes are circular.

5. A rotor comprising:
the magnetic member defined in claim 1; and
field magnets respectively inserted into said holes and each exhibiting pole faces different from each other toward said outer periphery and said inner periphery.

6. A motor comprising:
the rotor defined in claim 5;
an inner peripheral side stator provided on the side of said inner periphery with respect to said rotor; and
an outer peripheral side stator provided on the side of said outer periphery with respect to said rotor.

7. A motor comprising:
a rotor including
a magnetic member with an annular outer periphery and an annular inner periphery, the magnetic member including
first portions and second portions alternately disposed in a circumferential direction,
said first portions respectively having holes extending almost in said circumferential direction, and
said first portions and said second portions being magnetically separated in said circumferential direction,
gaps provided at both ends of said holes in said circumferential direction between said outer periphery and said inner periphery,
said first portions and said second portions being magnetically separated by said gaps, and
a width of said gaps is larger than twice the larger one of a first distance between said inner periphery and said inner peripheral side stator and a second distance between said outer periphery and said outer peripheral side stator, and
field magnets respectively inserted into said holes and each exhibiting pole faces different from each other toward said outer periphery and said inner periphery;
an inner peripheral side stator provided on the side of said inner periphery with respect to said rotor; and
an outer peripheral side stator provided on the side of said outer periphery with respect to said rotor.

8. A motor comprising:
a rotor including
a magnetic member with an annular outer periphery and an annular inner periphery, the magnetic member including
first portions and second portions alternately disposed in a circumferential direction,
said first portions respectively having holes extending almost in said circumferential direction, and
said first portions and said second portions being magnetically separated in said circumferential direction, and
field magnets respectively inserted into said holes and each exhibiting pole faces different from each other toward said outer periphery and said inner periphery;
an inner peripheral side stator provided on the side of said inner periphery with respect to said rotor; and
an outer peripheral side stator provided on the side of said outer periphery with respect to said rotor,
a relative positional relationship in said circumferential direction between the center in said circumferential direction of a teeth section provided for said inner peripheral side stator and the center in said circumferential direction of a teeth section provided for said outer peripheral side stator being variable.

9. The motor according to claim 7, wherein
a relative positional relationship in said circumferential direction between the center in said circumferential direction of a teeth section provided for said inner peripheral side stator and the center in said circumferential direction of a teeth section provided for said outer peripheral side stator is variable.

10. A compressor equipped with the motor defined in claim 6.

11. A compressor equipped with the motor defined in claim 7.

12. A blower equipped with the motor defined in claim 6.

13. A blower equipped with the motor defined in claim 7.

14. An air conditioner comprising the compressor defined in claim 10.

15. An air conditioner comprising the compressor defined in claim 11.

16. An air conditioner comprising the blower defined in claim 12.

17. An air conditioner comprising the blower defined in claim 13.

18. A vehicle-mounted air conditioner comprising a compressor equipped with the motor defined in claim 8.

* * * * *